United States Patent
Adams et al.

[15] 3,691,696
[45] Sept. 19, 1972

[54] APPARATUS FOR MACHINING CUTTER TEETH

[72] Inventors: Ralph D. Adams, Escondido; Efrain D. Lopez, Pasadena, both of Calif.

[73] Assignee: Omark-Winslow Aerospace Tool Co., Portland, Oreg.

[22] Filed: Jan. 4, 1971

[21] Appl. No.: 103,626

[52] U.S. Cl. ..................................51/95 TG, 51/232
[51] Int. Cl. ........B24b 3/00, B24b 5/00, B24b 47/02
[58] Field of Search.....................51/95 R, 95 LH, 95 WH, 95 TG, 51/123 R, 232

[56] References Cited

UNITED STATES PATENTS 2,840,958   7/1958   Waller.....................51/232 X

*Primary Examiner*—Othell M. Simpson
*Attorney*—Forrest J. Lilly

[57] ABSTRACT

A machine for grinding the surfaces of helical teeth on a cutter, and having means for positioning a cutter alongside a grinding wheel and moving the cutter axially relative to the wheel while turning the cutter at a rate directly related to the spiral of the tooth about the cutter, thereby to present the full length of the tooth to the grinding wheel in a smooth, continuous motion. A movable tooth rest is pressed against one side of the tooth to be deflected laterally in response to the force developed between the tooth and the tooth rest, and deflection of the tooth rest operates a control valve for variably rotating the cutter. The motor is driven by a flow of fluid regulated by the control valve, and leakage that could create a pressure drop across the motor is made by an adjustable compensating valve. Fine adjustments are provided for correlating the deflection of the tooth rest with the resulting rates of cutter rotation.

24 Claims, 4 Drawing Figures

PATENTED SEP 19 1972

INVENTORS
RALPH D. ADAMS
EFRAIN D. LOPEZ
BY Forrest J. Lilly
ATTORNEY

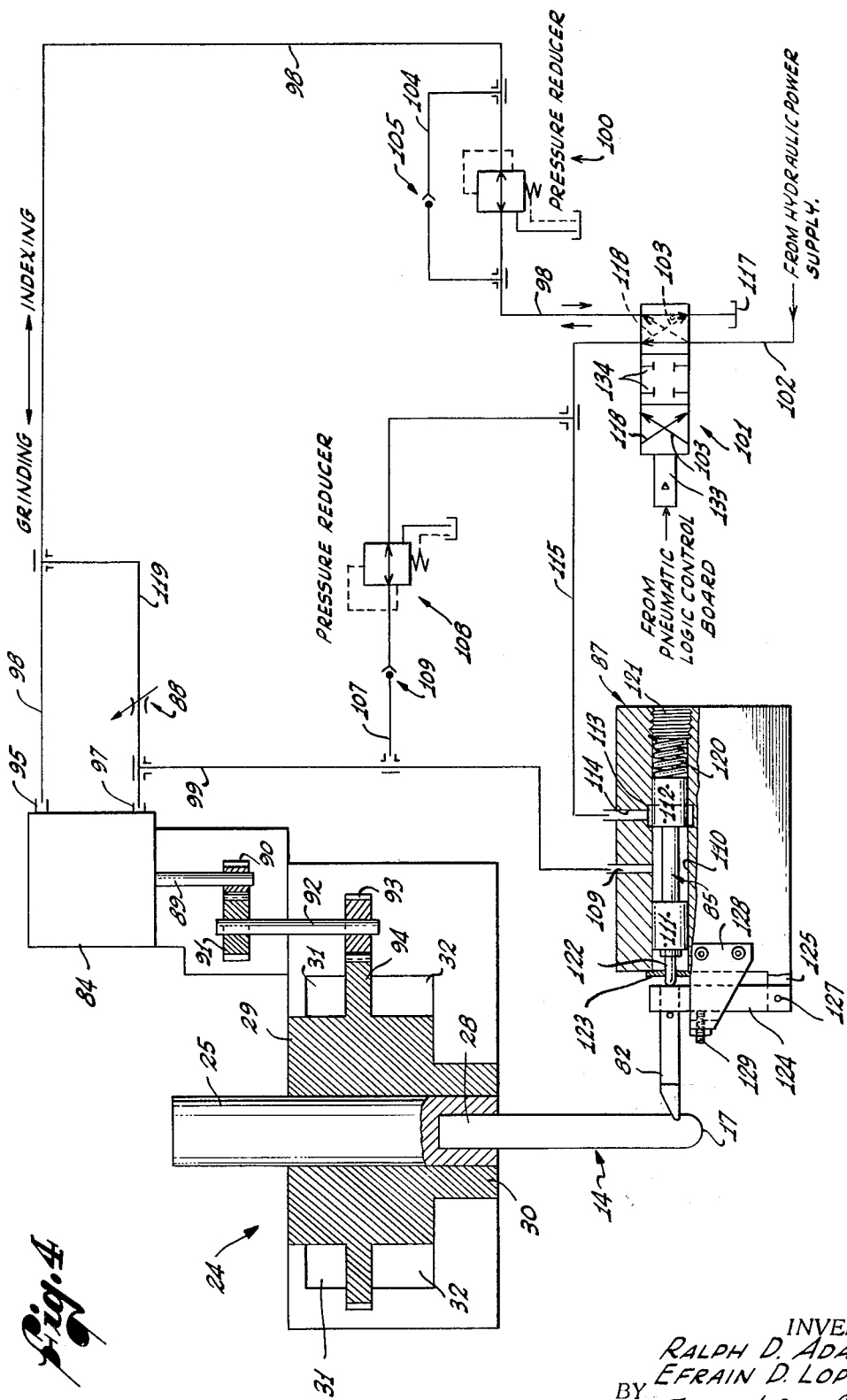

APPARATUS FOR MACHINING CUTTER TEETH

BACKGROUND OF THE INVENTION

This invention relates to the machining of workpieces and, more particularly, workpieces such as rotary milling cutters which have at least one helical tooth spiraling around its outer peripheral surface from one end toward the other. The machining operation forms at least one finished outside surface on the tooth in precisely located relation with an edge of the tooth.

While the invention may be utilized in various types of machining operations and for different types of workpieces, it is particularly useful in a grinder for shaping or sharpening machine tool cutters such as ball end mills having a plurality of helical teeth that are defined between a plurality of helical flutes or grooves. The leading edge of each tooth as the cutter is rotated in one direction about its axis constitutes a cutting edge of the cutter, and these cutting edges are ground along the outside surfaces of the teeth to form sharpened edges and to provide the proper angular relationship between the sidewall and the outside surface of the tooth for effective cutting action.

More specifically, each tooth of a cutter is fed past the edge of a grinding wheel in contact therewith so that the grinding wheel finishes the outside surface of the tooth to the desired clearance angle relative to the leading sidewall, while sharpening the edge of the tooth along this sidewall. This forms the so-called primary relief angle, which is measured between the ground surface and a line tangent to the outside diameter of the cutter at the cutting edge.

To present the full length of each tooth to the grinding wheel in a single, continuous motion, the shank end of the cutter is gripped in a work holder which feeds the cutter axially or longitudinally along the wheel, and the cutter is turned about its axis at a controlled rate directly related to the rate at which the tooth spirals around the cutter, thereby moving the full length of the tooth to be sharpened past the wheel in a smooth motion. After one tooth has been ground, the cutter is indexed through a selected angle to present the next tooth to the wheel, and the grinding operation is repeated. Secondary relief angles then are ground on the teeth behind the primary relief angles in spaced relation with the cutting edges. These secondary angles increase the clearance and thus eliminate tendencies for the teeth to rub on the work, while keeping the width of the land within proper limits.

It will be appreciated that precise control of the relative rates of axial feeding and rotation of a cutter is necessary in order to maintain the proper relationship between the cutting edge and the grinding wheel for high precision grinding of each tooth. The purposes and specifications for the relief angles are well known to those skilled in the art, and it should be sufficient for present purposes to state that it is important for effective cutting action to maintain these angles and the concentricity of the surfaces of the cutter within extremely close tolerances.

Since the proper rate of rotation for a given rate of axial feed varies with the diameter and helix angle of the cutter, and since there may be variations in a given cutter requiring changes in the rate of rotation along the length of a single tooth, or from one tooth to the next, one frequently used approach has been to mount the cutter in the work holder for relatively free rotation, and to press an elongated finger firmly against the sidewall of the tooth, closely adjacent the edge being ground, holding this finger stationary as the cutter is moved axially past both the finger and the wheel. With this type of arrangement, the sidewall of the tooth is dragged along the finger (called a "tooth rest") and the cutter is turned solely by the cooperative camming action of the tooth rest and the sidewall. Thus, the rate of turning is determined by the tooth itself, for a direct correlation of axial and rotary feed rates. An example of this approach is shown in Southland application Ser. No. 836,467, filed June 25, 1969, which also shows one type of grinding machine with which the present invention may be used.

While the foregoing approach is satisfactory for many purposes, it has been found that the lateral force of the tooth rest against the cutter and the drag developed against the tooth tend to deflect the cutter laterally, and thus can have an adverse affect on the precision of the grinding operation. This problem can be particularly acute when grinding cutters of relatively small diameters and correspondingly low resistance to lateral deflection.

SUMMARY OF THE PRESENT INVENTION

The present invention resides in the combination with a machine of the foregoing general character, of a motor for positively rotating the workpiece in the proper direction and at a variable rate, and means responsive to the lateral force developed between the tooth and the tooth rest or the like to variably control the operation of the motor in response to variations in the sensed force. This maintains that force within controlled limits and sufficiently low to virtually eliminate deflection.

More specifically, the tooth rest is supported to be pressed lightly against the tooth, and to be deflected laterally away from its normal position in response to an increase in force resulting from axial movement of the workpiece producing lateral movement of the sidewall of the tooth. Such deflection is used to control the motor for rotating the workpiece.

In the preferred embodiment shown herein, the workpiece is rotated by a fluid-driven motor and the lateral deflection of the tooth rest is applied to a movable valve member that is displaceable out of a closed position to start, and then progressively increase, the flow of fluid through the motor as the deflection of the tooth rest from its normal position increases. For the precise control of motor operation required for high precision machining, the fluid leakage that is normal in a fluid control system such as this is offset by means of a fluid compensator which makes up the leakage and thus eliminates any adverse affect it otherwise would have on accuracy.

Other features of the invention, including the manner of mounting of the tooth rest for proper response to very slight variations in force at the tooth rest will be apparent from the following detailed description, taken in conjunction with the accompanying drawings.

BRIEF DESCRIPTION OF THE DRAWINGS

FIG. 4 is a schematic view of the basic elements of the control system with the tooth rest and the control valve shown in side elevation and part of the valve broken away and shown in cross-section.

DETAILED DESCRIPTION

Figure 1:
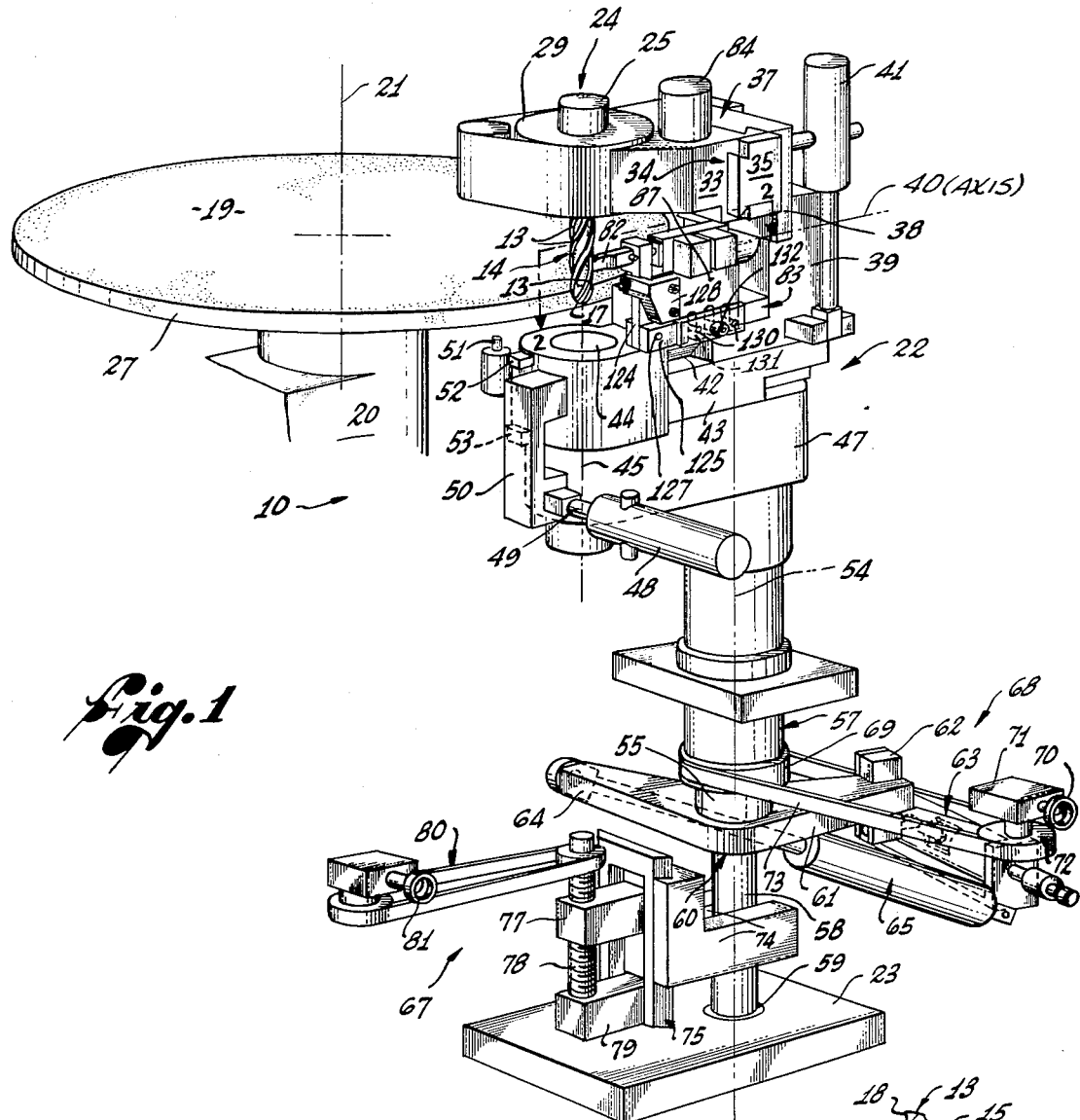
FIG. 1 is a fragmentary perspective view of the basic components of an illustrative grinding machine equipped with a tooth rest and control system embodying the novel features of the present invention.

As shown in the drawings for purposes of illustration, the invention is embodied in a machine 10 for grinding clearance or relief angles 11 and 12 (FIG. 3) on the outer surfaces of helical teeth 13 on a workpiece such as a ball end-mill cutter 14. The illustrative cutter has four helical teeth, as seen most clearly in FIGS. 2 and 3, spiraling around an integral shaft 15 and separated by four helical grooves or flutes. The teeth terminate on the "ball" end or nose 17 of the cutter in specially shaped and machined cutting portions, and extend upwardly along the shaft 15 to a level short of the upper end, leaving a shank above the teeth which is mountable in the spindle of a milling machine (not shown).

As previously mentioned, the primary relief angle 11 (see FIG. 3) is ground on each tooth 13 of such a cutter along the leading edge 18 of the tooth, thus sharpening the leading edge and producing a land extending along the edge. Then a larger secondary relief angle 12 is ground on the tooth to provide increased clearance behind the land, while also determining the width of the land.

In general, the illustrative machine 10 comprises a grinding wheel 19 of relatively large diameter which herein is shown as mounted on a support 20 for rotation about a vertical axis 21, and a workpiece positioning and feeding assembly 22 upstanding from a base 23 and supporting a movable work head 24 along one side of the grinding wheel with a work holder 25 positioned on the head to hold a cutter 14 alongside the wheel for engagement with the edge 27 of the wheel. The various elements of the positioning and feeding assembly make it possible to move any selected tooth 13 of the cutter into engagement with the wheel, to select different angular positions of the cutter for engagement with the wheel, to feed the cutter axially relative to the wheel, and to rotate the cutter about a transverse axis for grinding of the teeth on the nose 17 as well as along the sides. Preferably, the machining of a tooth begins at the upper end, adjacent the shank, and progresses downwardly toward the nose, the cutter being raised along the grinding wheel for this purpose.

These basic machine elements are described in detail in the aforesaid application, and now are known in the trade, so the present discussion may be limited to a general description of the elements and the functions they are capable of performing with respect to the grinding of relief angles and the like. As shown schematically in FIG. 4, the upper end portion or shank 28 of the cutter 14 extends upwardly into and is suitably clamped in the work holder 25, which is telescoped into a rotor 29 in the head having a chuck at 30 for gripping the work holder during the various machining operations that may be performed with a machine of this type. The rotor is journaled in the head in suitable bearings 31 and 32, which may be hydrostatic bearing blocks, and is axially fixed relative to the head. Thus, the cutter is rotatable relative to, and axially movable with, the head.

For adjustable positioning of the work head 24 and the cutter 14, a guide block 33 on one side of the head has a sliding dovetail connection 34 with the adjacent side of a mating block 35, permitting horizontal adjustment of the head in the attitude shown in FIG. 1. The mating block has a vertical dovetail connection 37 with a support leg 38, so that the head can be adjusted vertically for different sizes of cutters. The support leg, in turn, is pivotally supported on a bracket 39 for angular movement about a horizontal axis indicated at 40, and its angular position about this axis is controlled by means of an actuating cylinder 41 pivotally connected at its lower end to the bracket and its upper end to the support leg.

The bracket 39, in turn is adjustable horizontally along a dovetail connection 42 on top of an arm 43, parallel to the axis 40, thus making it possible to move the head 24 and related elements as a unit parallel to the axis 40, generally from right to left and back, as viewed in FIG. 1, for lateral positioning of the cutter 14 relative to the grinding wheel 19. Adjacent the left end of the arm 43 is a pivot 44 which defines a vertical axis 45 for back and forth swinging of the right end portion of the arm in a horizontal plane on a platform 47 immediately beneath the arm. This swinging is controlled by a power cylinder 48 mounted on the platform by a suitable bracket (not shown) and having a piston rod 49 pinned to a second bracket 50 which is attached to the arm 43. Suitable adjustable stops 51, 52 and 53 are provided to limit such swinging in selected angular positions of the arm.

Finally, the platform 47 is mounted on the base 23 for selective adjustment of its angular position about a vertical axis 54, and also to be raised and lowered along this axis. For such raising and lowering of the platform (and, of course, of the tool head 24 and the cutter 14), a hollow hydraulic cylinder 55 is fastened at its upper end (not shown) to the underside of the platform and extends downwardly through a stationary cylindrical housing 57, the lower end portion of the hydraulic cylinder being exposed in FIG. 1. A piston rod 58 projects downwardly from a piston within the cylinder 55 to a bearing 59 on the base 23, so that alternate extension and retraction of this piston rod hydraulically raises and lowers the platform 47.

For angular adjustment of the platform 47 about the axis 54, a bell crank 60 is fastened to the lower end of the hydraulic cylinder 55, which is rotatably and slidably supported in bearings (not shown) in the housing 57. One laterally projecting arm 61 of this bell crank carries a pressure plate 62 which is swingable about the axis 54 by a feed cylinder 63, and the other arm 64 of the bell crank is connected to an antibacklash and return cylinder 65. Thus, the two cylinders 63 and 65 cooperate to effect back and forth rocking of the bell crank, and thereby turn the hydraulic cylinder 55 and the platform 47 back and forth about the axis 54.

Suitable adjustable stop mechanisms 67 and 68 are provided to limit the up and down movement of the platform 47 and the elements carried thereby, including the cutter 14. The mechanism 68 for determining the upper limit herein comprises a stop collar 69 threaded onto the housing 57 above the bell crank 60, and a hand wheel 70 rotatably supported in a housing 71 to turn on output sprocket 72 and drive an endless flexible chain 73 which is coupled to the collar 69. The chain and sprocket are shown schematically in FIG. 1. The chain thus rotates the collar and adjusts it vertically on the cylindrical housing to vary the level at which the bell crank abuts against the collar as the hydraulic cylinder 55 rises. Since this sets the upper position of the work head 24, it determines the end of the upward feeding movement of the cutter 14 past the grinding wheel 19.

The stop mechanism 67 for limiting downward movement of the work head 24 includes a pair of L-shaped blocks 74 which straddle the piston rod 58 in position to engage the underside of the bell crank 60 as the hydraulic cylinder 55 descends along the piston rod. These blocks are slidable vertically along an inverted U-shaped guide frame 75, and carry an arm 77 which projects through the guide frame and forms a travelling nut which is threaded onto a vertical lead screw 78 having its lower end rotatably supported in a bearing block 79 on the base 23.

Attached to the upper end of the screw 78 is a chain and sprocket adjusting mechanism 80 that is drivable by means of a hand wheel 81 to turn the lead screw selectively about its axis, thereby raising and lowering the travelling nut 77 and the stop blocks 74 along the screw. This sets the level of the work head 24 at which the bell crank 60 engages the stop blocks as the head is being lowered, and thus determines the starting height of the cutter 14 for engagement with the teeth 13 of the cutter. Accordingly, the stop collar 69 and the stop blocks 74 may be set manually for a selected increment of vertical feed of the work head corresponding to the axial length of a cutter tooth to be machined.

Figure 2:
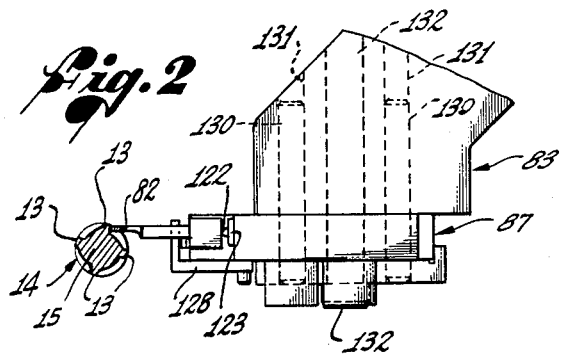
FIG. 2 is an enlarged fragmentary view taken substantially along line 2—2 of FIG. 1 and showing the tooth rest and its supporting structure in plan, and the workpiece in cross-section.
Figure 3:
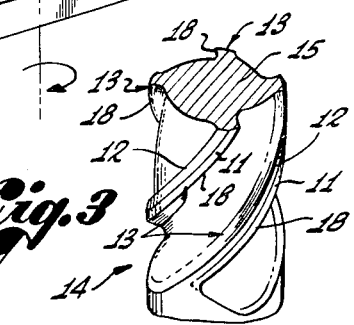
FIG. 3 is an enlarged fragmentary perspective view of part of the workpiece.

Shown in FIGS. 1, 2 and 4 in a conventional cutter-engaging position is a tooth rest 82 in the form of an elongated finger or blade which is supported on a slide 83 laterally spaced from the cutter, to the right in this instance, and projects horizontally from the slide toward the cutter and into pressing engagement with the sidewall of one of the teeth 13 of the cutter. The slide 83 is suitably supported on the machine frame for movement toward and away from the cutter, thereby permitting selective engagement of the tooth rest with a tooth in an active position shown in the drawings, and disengagement of the tooth rest by movement away from the cutter into an inactive position. This facilitates changing of workpieces to be machined and indexing of different teeth into position to be engaged by the tooth rest and to be ground by the wheel 19.

In prior machines, including the machine described in the aforesaid application, turning of the cutter 14 during axial feeding movement has been effected by the tooth rest 82, which bears against the sidewall of the tooth and cooperates with the sidewall to push the tooth angularly about the axis of the cutter at a rate determined by the rate of axial feed and the helix angle and diameter of the cutter. As previously mentioned, this conventional method of turning the cutter has worked satisfactorily for many applications, but sometimes results in excessive drag and a tendency to deflect the cutter laterally, tending to introduce inaccuracies into the machining of workpieces, particularly workpieces of relatively small diameters.

In accordance with the present invention, a motor 84 is provided to positively rotate the workpiece 14 during machining of the teeth 13 thereon, and means are provided for sensing the lateral force developed between a tooth and the tooth rest 82 and controlling the operation of the motor 84 to turn the workpiece at the proper rate necessary to maintain the force of the tooth rest within controlled limits. These limits are sufficiently low to eliminate any appreciable tendency toward deflection of either the workpiece or the tooth rest. In other words, instead of using the tooth rest to push on the tooth in order to turn the workpiece, the tooth rest merely feels the changing angular position of the tooth wall and directs the motor to turn the workpiece at the proper variable rate.

For this purpose, the tooth rest 82 is mounted on the slide 83 to be pressed, initially, against the sidewall of the tooth 13 in the usual manner, but with a light yieldable force, and to be deflected away from the cutter in response to an increase in that force. Such deflection of the tooth rest is applied to a movable member 85 (FIG. 4) controlling the operation of the motor 84, starting the motor in the proper direction in response to initial deflection and increasing and decreasing the rate of rotation of the motor, and thus of the workpiece, as the deflection varies.

For rapid and accurate response in an economically practical system, the motor 84 is of the fluid-driven type and the control member 85 is the spool of a control valve 87 and is displaceable away from a closed position to start and progressively increase the fluid flow through the motor. Fluid leakage, which is inherent in such a system and tends to affect the response of the motor adversely, is offset in a novel manner by a flow compensator 88 (FIG. 4).

The specific control system shown herein for purposes of illustration uses a single reversible motor 84 for both machining the teeth 13 and indexing the cutter 14 to present successive teeth to the grinding wheel 19. As shown schematically in FIG. 4, this motor has an output shaft 89 carrying a pinion gear 90 which meshes with a gear 91 on the upper end of a shaft 92. On the other end of this shaft is a similar gear 93 which meshes with a larger ring gear 94 encircling the rotor 29 so as to turn the rotor at a suitably reduced rate when the motor 84 is in operation.

While the motor 84 may take various forms, the preferred form is a ball type, low displacement motor characterized by low starting torque. The two ports 95 and 97 of the motor are connected to two lines 98 and 99, the port 95 being the inlet port during the grinding operation and the port 97 being the exhaust port. When the cutter 14 is to be indexed to present a different tooth 13 to the grinding wheel 19, the flow is reversed and fluid is introduced through the line 99 and the port 97 and exhausted through the line 98 and the port 95.

It will be seen in FIG. 4 that the grinding inlet line 98 is connected through a pressure reducer 100 to a selector valve 101 which, in one condition of the valve, connects a supply line 102 across the dotted line path 103 to line 98 and the pressure reducer. A by-pass line 104 around the pressure reducer has a check valve 105 therein which is closed by pressure in the line 104 to the left of the valve, so all fluid flow in the line 98 is through the pressure reducer. This is the forward, actuating flow for the motor 84 during grinding.

The line 99 connected to the port 97 (the exhaust port during grinding) extends downwardly from the motor 84 past a junction with a by-pass line 107 containing another pressure reducer 108. A check valve 109 in this by-pass line is closed when there is pressure in the line 99, so the pressure reducer 108 is inactive during the grinding operation. At its lower end, the grinding exhaust line 99 is connected to a passage 109 in the housing of the control valve 87 for controlling the rate of operation of the motor 84 by variably blocking the exhaust line 99 and thereby varying the rate of flow of fluid through the motor.

This control function is performed by the valve spool 85 which is slidable endwise back and forth in a bore 110 in the housing of the valve 87 and has one head or land 111 effectively sealing the left end of the bore, and also has a second land 112 disposed across an annular port 113 around the inside of the bore. This port communicates with a passage 114 leading to a return line 115 which may be connected through the selector valve to a sump 117, as indicated by the dotted line path 118 in FIG. 4.

When the spool 85 is in the closed position shown in FIG. 4 with the spool head 112 blocking flow from the valve inlet passage 109 to the valve outlet port 113, no flow other than leakage can pass through the motor 84. Thus the motor remains inactive, and does not turn the cutter 14.

Fluid leakage can be expected to occur through the control valve 87, and to produce a slight pressure drop across the motor 84, thus tending to start the cutter 14 turning even when the valve is closed. As has been stated, the motor requires only a low starting torque, and thus could respond to the pressure drop resulting from such leakage.

To eliminate the adverse influence of leakage in the system, the invention provides the compensator 88, which is a selectively adjustable needle valve in a line 119 connected across the motor 84 from the inlet line 98 to the exhaust line 99 ahead of the control valve 87. The needle valve is set to bleed fluid to the exhaust port 97 at a low, selected rate, thereby making up the leakage that escapes through the control valve.

As the control valve spool 85 is displaced to the right from the closed position shown in FIG. 4, the left end of the spool head 112 moves past the left edge of the port 113 and cracks open an annular flow area communicating between the inlet passage 109 and the port 113, thus permitting fluid to flow through the valve at a rate proportional to the open flow area. Of course, fluid flows through the motor 84 at virtually the same rate. As the spool is moved farther to the right, the flow area and the resulting flow rate through the motor increase proportionally, thereby progressively accelerating the motor and increasing the rate of rotation of the cutter 14 through the reduction gearing coupling the output shaft 89 of the motor to the work holder 25.

Of course, movement of the valve spool 85 back to the left progressively throttles the flow through the control valve 87 and the motor 84, correspondingly reducing the rate of rotation of the cutter 14. A light spring 120 is confined in the right end of the bore 110 between the spool head 112 and a plug 121 to urge the spool yieldably to the left toward the closed position.

As shown most clearly in FIG. 4, the tooth rest 82 is mounted on the left side of the housing of the control valve 87, preferably in line with the valve spool 85, for movement to the right from the normal position shown, and such movement is transmitted to the valve spool by means of a pin 122 between the left end of the spool and the rear or right end of the tooth rest. Herein, the pin is fastened to the end of the spool and projects out of the bore 110 through a closure plate 123 having an opening through which the pin extends with a close sliding fit.

The tooth rest 82 is tapered nearly to a point at its free end, and is fastened at its other end to the upper end of an arm 124 that extends upwardly along the left side of the valve housing, being pivoted adjacent its lower end between a pair of lugs 125 projecting forwardly from the valve housing. A pin 127 pivotally supports the arm between the lugs for rocking movement toward and away from the cutter 14.

To limit the rocking of the arm 124 toward the cutter 14, an L-shaped bracket 128 (see FIGS. 2 and 4) is fastened to one side of the valve housing and extends outwardly, to the left alongside the arm, then hooking between the arm and the cutter. An adjustable stop screw 129 is threaded through this bracket into abutting engagement with the arm 124, as shown in FIG. 4, thus cooperating with the spring 120 in setting the initial angular position of the arm and the corresponding position of the tooth rest. The arm is blocked against swinging counterclockwise from this position, but can yield in a clockwise direction against the force of the spring 120.

Using the stop screw 129 and the leakage compensator 88 as fine-tuning adjustments, the system can be set to provide appropriate motor speeds for selected small increments of deflection of the tooth rest 82 and corresponding displacement of the valve spool 85. For example, a maximum deflection of 0.004 to 0.006 of an inch of the tooth rest can produce a speed of rotation of the cutter 14 of about 20 revolutions per minute. The motor speed that will produce this cutter speed through the reduction gearing, of course, is substantially higher. One suitable reduction ratio is twelve to one.

In setting up the proper deflection and speed relationship, the tooth rest 82 may be deflected until the measured output speed at the work holder 25 is at the desired maximum rate, such as 20 revolutions per minute. The tooth rest may be backed up an amount equal to the desired maximum amount, such as 0.004 of an inch, and the compensator 88 is adjusted to progressively increase the compensating flow in the line 119 until motor rotation is stopped. When the tooth rest is again deflected the desired maximum amount, the rate of rotation may be measured to determine whether it is at the desired maximum. Minor variations then may be corrected by fine adjustment of the stop screw 129.

The slide 83 supporting the tooth rest assembly is shown fragmentarily in FIG. 2, and may be basically conventional in construction and operation. The control valve housing is pinned to the slide by dowels 130 inserted through notches 131 (see FIG. 1) in the lower edge of the housing, and is fastened in place by a bolt 132.

The selector valve 101 shown schematically in FIG. 4 has a spool 133 that is movable to different positions for three different conditions of the control system. When the spool is displaced to the left, the supply line 102 is connected to the line 115 and the sump 117 is connected to the line 98, thus providing a reverse flow through the motor 84 from the pressure reducer 108 to operate the motor in reverse, as compared to the normal, grinding direction. The check valve 109 opens automatically to permit the flow of fluid through the pressure reducer 108, and the check valve 105 opens to by-pass exhaust fluid around the pressure reducer 100.

When the selector valve spool 133 is displaced to the right, the supply line 102 is connected to the line 98 and the sump 117 is connected to the line 115, both as indicated by the dotted-line paths 103 and 118 in FIG. 4. This produces the forward flow of fluid through the motor 84 for the grinding operation. Both of the check valves 105 and 109 are closed, thereby activating the pressure reducer 100 and deactivating the pressure reducer 108 so that all exhaust fluid from the motor must pass through the control valve 87.

The third position of the spool 133 of the selector valve 101 is the centered position, in which all flow through the valve is blocked. This is indicated schematically at 134 in FIG. 4, and is the "off" condition of the system in which the motor 84 is deactivated. This is the condition when neither grinding nor indexing is to be done.

A machine of the type with which this system is to be used may be manually controlled, but typically has an automatic control such as a pneumatic logic control board (not shown) for actuating the selector valve 101 in timed relation with the other movements of the machine parts, most notably for present purposes, the operation of the hydraulic cylinder 55 (FIG. 1) for effecting the vertical feeding movements of the work head 24 and the cutter 14. The selector valve spool 133 is in the "off" or centered position while the cutter is positioned for the grinding operation, is moved to the right to the "grind" position preparatory to the grinding stroke of the hydraulic cylinder 55, and is moved to the left after completion of the grind to index the cutter and bring another tooth 13 into position to be ground.

It will be seen that the control valve 87 is activated to regulate the flow through the motor 84 automatically as an incident to the change to the "grind" condition, and remains effective to control the rate of rotation of the cutter 14 so long as the system remains in the "grind" condition. Whenever the slide 83 is retracted away from the cutter 14, however, the spring 120 maintains the spool 85 in the closed position, thus preventing any forward flow through the motor.

From the foregoing, it will be evident that the present invention turns the cutter automatically at the proper, variable speed to present the full length of each tooth 13 to the grinding wheel 19, while virtually eliminating drag and deflection at the cutter tooth. Moreover, this is accomplished in a relatively simple and inexpensive manner, using the previously used tooth rest to perform the function of feeling and signaling angular movement of the sidewall of the tooth, rather than to push the tooth and produce the cutter rotation directly. The fluid driving system including the leakage compensator 88, insure that the motor will respond promptly and accurately to changes in the deflection of the tooth rest.

It also will be evident that, while a particular form of the invention has been illustrated and described in combination with a particular machine, various modifications can be made without departing from the spirit and scope of the invention.

We claim:

1. In an apparatus for grinding relief angles on the helical teeth of a cutter, and including a grinding wheel, means for holding a cutter alongside the wheel and moving the cutter axially relative to the wheel while permitting rotation of the cutter during such axial movement, and a tooth rest engageable with one of the teeth to control rotation of the cutter during axial movement, the improvement comprising:

means supporting the tooth rest in a preselected position relative to the grinding wheel for engagement with one of the teeth, and also supporting the tooth rest to yield and be deflected away from the cutter as the tooth is moved axially past the tooth rest;

a variable speed, fluid driven motor for rotating the cutter during such axial movement;

a control system for supplying fluid to said motor to drive the latter;

a control valve for varying the flow of fluid through the motor and thereby varying the rate of rotation of the cutter, said control valve including a valve member that is displaceable away from a closed position to progressively increase the flow through said motor and the rate of rotation of the cutter produced thereby;

and means for displacing said valve member away from said closed position in accordance with the deflection of said tooth rest from said preselected position, thereby to vary the rate of rotation of the cutter in direct relation with the angular movement of the tooth about the cutter, turning the cutter during such axial movement to present the length of the helical tooth to the grinding wheel in a smooth continuous motion.

2. The improvement defined in claim 1 in which said control valve is subject to leakage creating a pressure drop across the motor and tending to turn the cutter in one direction, and in which said control system includes a leakage compensator for supplying fluid under pressure between said motor and said control valve, thereby offsetting the leakage and eliminating said pressure drop.

3. The improvement defined in claim 2 in which said control valve controls the flow through said motor by regulating the exhaust flow therefrom, and said leakage compensator is a selectively adjustable valve supplying fluid to the outlet side of the motor.

4. The improvement defined in claim 1 in which said tooth rest is a blade engageable at one end with the tooth, said blade being supported on one end portion of an arm pivotally mounted for swinging movement toward and away from the cutter.

5. The improvement defined in claim 4 further including adjustable stop means for limiting swinging of the arm toward the cutter, and a spring urging the arm toward said stop means with a preselected light force, thereby determining the force required to deflect the tooth rest away from the cutter.

6. The improvement defined in claim 5 in which said valve member is disposed between said arm and said spring.

7. The improvement defined in claim 1 in which said control valve is supported beside the path of said cutter during such axial movement, said tooth rest is supported on one side of the valve on the free end portion of an arm generally parallel to said path and pivoted at one end on the valve, and said valve member is disposed between said free end portion and a spring resisting deflection of the tooth rest and displacement of said valve member.

8. The improvement defined in claim 7 further including stop means positioned to limit swinging of said arm toward said path, thereby determining said preselected position of said tooth rest.

9. The improvement defined in claim 8 in which said stop means comprise a bracket supported on said valve, and a screw threaded through a portion of said bracket and abutting against one side of said arm.

10. The improvement defined in claim 1 in which said motor is of the ball type having low starting torque, and is reversible for indexing of the cutter between different angular positions.

11. In an apparatus for machining the helical teeth of a cutter, and including a work holder for gripping the cutter, means for moving the work holder to feed the cutter axially along a predetermined path while permitting rotation of the cutter, and a tooth rest engageable with the cutter along one of the teeth thereof to control rotation of the cutter during such feeding, the improvement comprising:

means supporting said tooth rest in a preselected position along said path for pressing engagement with one of said teeth, and holding the tooth rest yieldably against the tooth for deflection away from the tooth in response to an outward force produced by angular movement of the tooth about the cutter as the latter is moved axially past the tooth rest;

a variable-speed motor for rotating said cutter in a direction to turn said tooth away from the tooth rest during such axial movement;

and actuating means for driving said motor at a rate directly related to the angular movement of said tooth about the cutter, said actuating means including a control member displaced from a normal position in accordance with deflection of said tooth rest from said preselected position, and means responsive to displacement to said control member to vary the rate of rotation of the cutter in proportion to such deflection, thereby to maintain the force between the tooth rest and the tooth within controlled low limits.

12. The improvement defined in claim 11 in which said motor is of the fluid-driven type having higher and lower pressure sides, and said actuating means is a fluid control system including a control valve for regulating the flow through said motor and the resulting rate of rotation of said cutter, said control member being a valve spool in said control valve displaceable away from a normal, closed position to progressively increase the flow through the valve and through the motor.

13. The improvement defined in claim 12 in which said control system is subject to fluid leakage tending to create a pressure drop across said motor, and includes a compensator for supplying a selected flow of fluid under pressure to the lower pressure side of the motor to offset said leakage.

14. The improvement defined in claim 12 in which said tooth rest is movably mounted to yield toward said control valve and is connected to said valve spool to displace the latter from said closed position a distance equal to the deflection of said tooth rest.

15. The improvement defined in claim 12 in which said tooth rest is mounted for deflection away from said path and toward said control valve, and further including a spring urging the tooth rest toward said path, and a stop limiting movement of the tooth rest toward said path to determine said preselected position.

16. The improvement defined in claim 15 in which said stop is adjustable toward and away from said path for fine tuning of said system.

17. The improvement defined in claim 15 in which said tooth rest is mounted on the free end portion of an arm pivotally supported for rocking toward and away from said path, and said valve spool is movable back and forth during rocking movement of said arm and is urged toward the latter by a spring which cooperates with said stop in holding said tooth rest yieldably in said preselected position.

18. In an apparatus for machining a workpiece having an axially extending tooth varying angularly about the axis of the workpiece while extending axially thereof, and including means for holding the workpiece and moving it axially along a predetermined path while permitting rotation of the workpiece during axial movement, and a feeler engageable with said tooth to control rotation of the workpiece during such axial movement, the improvement comprising:

means supporting said feeler in a preselected position for pressing engagement with the tooth in position to be deflected away from said preselected position as the tooth varies angularly about the workpiece during such axial movement;

a motor for rotating said workpiece at a variable rate;

means for sensing deflection of said feeler from said preselected position;

and actuating means for said motor controlled by said sensing means and operating said motor to turn the workpiece at a variable rate correlated with the angular movement of the tooth about the workpiece and to maintain the feel in engagement with the tooth with a controlled force.

19. The improvement defined in claim 18 in which said feeler is a blade extending transversely of said path for engagement with a sidewall of said tooth, and supported for yielding away from said path in response to a force between the sidewall and said tooth exceeding a preselected force.

20. The improvement defined in claim 19 in which said motor is of the fluid-driven type, and said sensing means is a control valve having a valve spool displaceable from a normal position by deflection of said feeler to start and accelerate said motor.

21. The improvement defined in claim 20 in which said feeler is spring-urged toward said path, and including a stop for limiting movement of said feeler toward said path.

22. The improvement defined in claim 20 in which said actuating means is a fluid control system for supplying driving fluid to said motor at rates varying in accordance with the displacement of said valve spool.

23. The improvement defined in claim 22 in which said control valve is subject to leakage tending to produce a pressure drop across said motor, and further including means for offsetting said leakage and eliminating said pressure drop.

24. The improvement defined in claim 23 in which said control valve controls the exhaust flow from said motor and said leakage-offsetting means include means for supplying fluid under pressure to said exhaust flow, and a selectively adjustable valve for setting the rate of flow thereto.

* * * * *